United States Patent
Boll et al.

(10) Patent No.: US 6,868,927 B2
(45) Date of Patent: Mar. 22, 2005

(54) METHOD FOR OPERATING A HYBRID DRIVE SYSTEM

(75) Inventors: Wolf Boll, Weinstadt (DE); Herbert Klein, Leutenbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/279,014

(22) Filed: Oct. 24, 2002

(65) Prior Publication Data

US 2003/0141122 A1 Jul. 31, 2003

(30) Foreign Application Priority Data

Oct. 25, 2001  (DE) .......................................... 101 52 809

(51) Int. Cl.[7] .................................................. B60K 1/00
(52) U.S. Cl. ..................... 180/65.4; 180/65.5; 180/65.3
(58) Field of Search ............................... 180/65.1, 65.2, 180/65.3, 65.4, 65.5, 65.6, 65.7, 65.8, 69.4; 429/13, 22, 24, 23, 25; 123/1 A, 3, 41.3, 288, 557, 558, DIG. 12

(56) References Cited

U.S. PATENT DOCUMENTS

| | | | | |
|---|---|---|---|---|
| 5,248,566 A | * | 9/1993 | Kumar et al. | .............. 180/65.3 |
| 5,678,647 A | * | 10/1997 | Wolfe et al. | ............... 180/65.3 |
| 6,276,473 B1 | | 8/2001 | Zur Megede | |
| 6,291,953 B1 | * | 9/2001 | Lovatt et al. | .............. 180/65.1 |
| 6,445,080 B1 | | 9/2002 | Daqoa et al. | |
| 6,536,547 B1 | * | 3/2003 | Meaney, Jr. | ............... 180/65.2 |
| 2003/0106726 A1 | * | 6/2003 | Yoshii | ....................... 180/65.1 |

FOREIGN PATENT DOCUMENTS

| | | |
|---|---|---|
| DE | 198 32 873 C2 | 1/2000 |
| DE | 199 13 794 A1 | 10/2000 |
| DE | 199 34 790 A1 | 2/2001 |
| DE | 100 13 597 A1 | 9/2001 |
| WO | 98/40922 | 9/1998 |
| WO | 99/19161 | 4/1999 |

* cited by examiner

Primary Examiner—Hau Phan
(74) Attorney, Agent, or Firm—Crowell & Moring LLP

(57) ABSTRACT

A method for operating a hybrid drive system of a motor vehicle includes the steps of operating the traction drive using an electrical motor (3) with power supplied from an auxiliary power unit (8), supplying power from an energy storage device (7) to the electric motor (3) when the traction drive demands power which are greater than the maximum possible power output of the auxiliary power unit (8), and supplying power from an internal combustion engine (2) only when the traction drive's power demand is greater than the total maximum possible power output from the auxiliary power unit (8) and from the energy storage device (7).

11 Claims, 1 Drawing Sheet

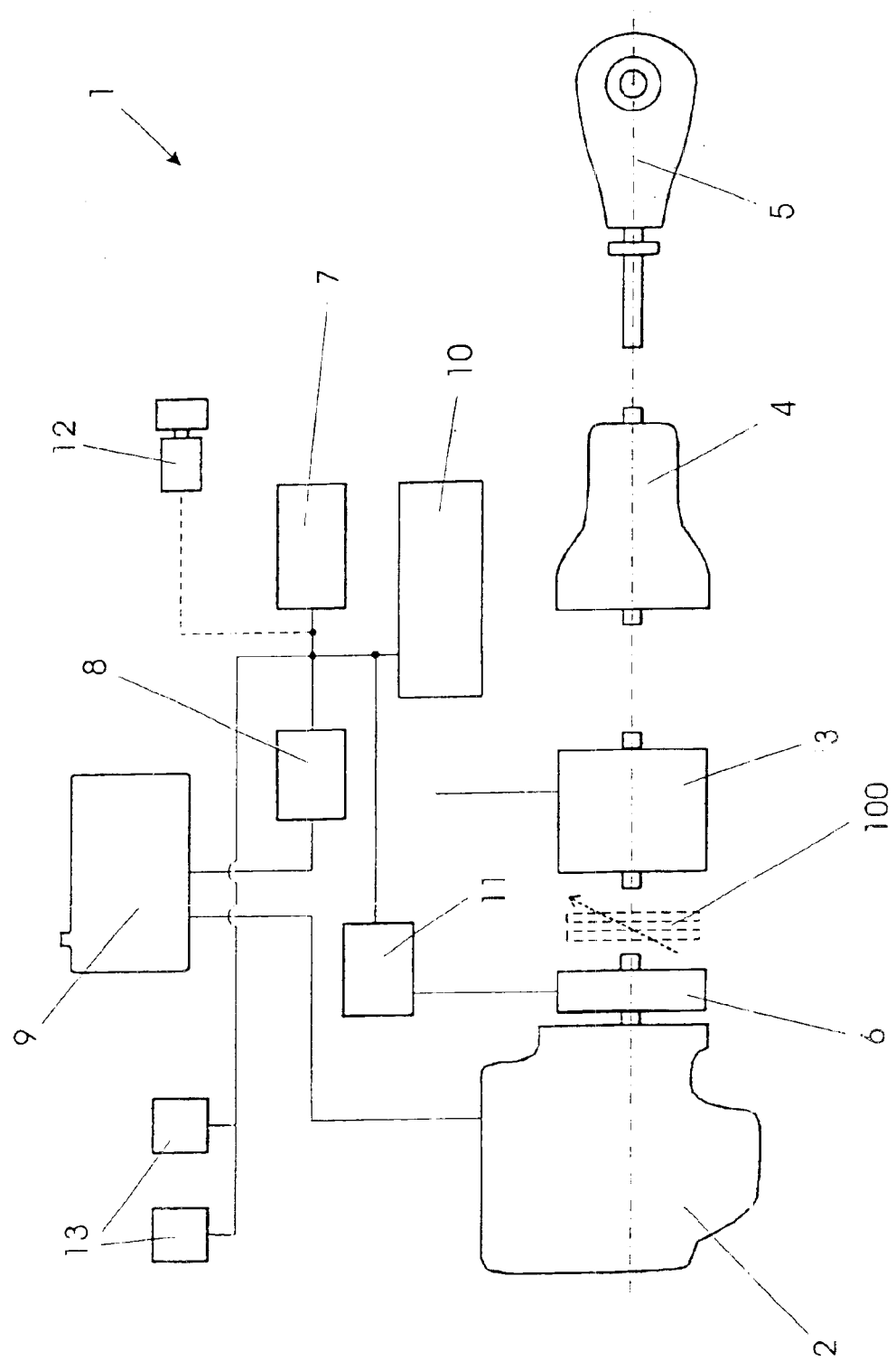

METHOD FOR OPERATING A HYBRID DRIVE SYSTEM

This application claims the priority of German Patent Document No 101 52 809.4-22, filed Oct. 25, 2001, the disclosure of which is expressly incorporated by reference herein.

BACKGROUND AND SUMMARY OF THE INVENTION

The invention relates to the method for operating a hybrid drive system for a traction drive for a motor vehicle.

DE 100 13 597 A1 describes a hybrid drive system which, inter alia, can be used as a traction drive for a motor vehicle. An internal combustion engine is provided as the vehicle traction motor, and the electrical power produced in a fuel cell is used to drive a drive electric motor.

DE 199 13 794 A1 describes another hybrid vehicle with a fuel cell drive and an internal combustion engine drive. The internal combustion engine is connected to a vehicle drive train via a clutch, and the fuel cell feeds an electric motor which can be coupled to the drive train. The internal combustion engine drive is used as the drive for the vehicle in a starting phase, until the fuel cell drive has heated up, to ensure immediate readiness for driving. In the starting phase, the internal combustion engine drive is also used for heating the fuel cell drive to operating temperature. For this purpose, the exhaust gases from the internal combustion engine are passed along the fuel cell, and the fuel cell and the internal combustion engine are connected to a common cooler. After reaching the operating temperature for the fuel cell drive, the drive power for the vehicle is provided solely by the fuel cell drive or, when a relatively high powered demand is made, together with the internal combustion engine drive.

WO 99/19161 describes a further hybrid vehicle which is driven by a combination of a fuel cell and a gas turbine. An electric motor is provided as the traction motor, and is connected to the fuel cell and to a generator of the gas turbine. The fuel cell and the gas turbine are designed such that approximately half the achievable vehicle power is provided in the form of electrical power via the fuel cell. When the power demands on the vehicle are below the maximum fuel cell power, the drive power is provided by the fuel cell and by the gas turbine, which is operated with the fuel cell exhaust gas. When a higher power demand is made, the gas turbine is additionally operated with hydrocarbon fuel, in order to increase the power. The heat from the gas turbine exhaust gas is used by means of a heat exchanger to preheat the supply air to the fuel cell and to the gas turbine.

WO 98/40922 describes a hybrid power production system having a fuel cell and an internal combustion engine. Hydrocarbon fuel is first of all split, in a pyrolysis reactor, into a fuel component containing hydrogen and a remaining fuel. The fuel cell is operated with the component containing hydrogen, and supplies the power for the electric motor. The remaining fuel is provided as drive fuel for the internal combustion engine. The work carried out by the internal combustion engine is provided as mechanical power, or is supplied by means of a generator as electrical power to the electric motor. The exhaust gas heat from the internal combustion engine is used for heating the pyrolysis reactor and for gasification of the hydrocarbon fuel. The hybrid power production system is intended for driving motor vehicles.

DE 199 34 790 A1 describes a drive system for motor vehicles, in which an auxiliary power drive is connected in parallel with an internal combustion engine. This can also provide the drive for the vehicle in the low load range.

Furthermore, a hybrid drive apparatus for vehicles having a fuel cell and internal combustion engine drive has been proposed in a patent application, which was not published prior to the present application, with the file reference DE 100 46 690.7. The hybrid drive apparatus has at least one fuel cell, one internal combustion engine, one generator, one electric motor and a common cooling device for the fuel cell and the internal combustion engine. The electric motor is intended as a traction drive and is supplied with power by means of the generator from the fuel cell and/or the internal combustion engine. The internal combustion engine, the fuel cell and the cooling device are thermally conductively connected to one another by heat conduction means, and control means are provided via which the flow of heat from the internal combustion engine to the cooling device and/or the fuel cell, of heat from the fuel cell to the cooling device and/or to the internal combustion engine, and/or of heat from the cooling device to the internal combustion engine and/or the fuel cell are/is controlled.

All the drive systems, as described above, use the high efficiency potential of the fuel cell in order to create a drive which is as efficient as possible. However, the fact that motor vehicles are most frequently used in city traffic, that is to say that they are operated in the partial load range, is frequently overlooked. Fuel cells, which are still very expensive at the moment, admittedly have a very high efficiency especially in the partial load range, but the full potential of such a drive is generally not made use of.

An object of the invention is thus to provide a method for operating a hybrid drive system for a traction drive for a motor vehicle, which allows good fuel consumption in the city cycle and in this case can be designed to be comparatively cost-effective.

Based on a method according to the invention, the output power of the electrical auxiliary drive unit is designed such that it can cover the mean traction power in typical city driving cycle, for example in the NEFZ city cycle or in the FTP75 city cycle. The electrical auxiliary power unit in this case feeds the traction battery continuously during operation, and both the capacity and the maximum possible power output of the traction battery are designed such that it can supply the electrical traction drive with its high accelleration demands in normal city traffic. This therefore means that the traction drive is supplied exclusively via the electrical auxiliary power unit at the medium traction power level in city traffic. As soon as the power which is required for the traction drive increases, an additional component of power is provided from the traction battery. When the power required for the traction drive is below the maximum possible power from the electrical auxiliary power unit, this will feed its excess power into the traction battery to recharge it.

When the power demands from the traction drive, for example during operation with a trailer with the heavy load and/or on gradients, rises above the total of the maximum possible power output from the auxiliary power unit and the energy storage device or traction battery, the internal combustion engine is connected, in order to compensate for the power deficit. This also occurs when the energy content of the electrical energy store falls below a limit value.

In order to allow the internal combustion engine to be connected as quickly as possible, the entire hybrid drive system may be operated, for example, via thermal management, according to application DE 100 46 690.7 (or the file reference 100 46 690.7), as has already been mentioned, which application is attached to this application and incorporated by reference herein in its entirety.

With a hybrid drive system it is possible to achieve fuel consumptions in the upper class of cars which correspond to an energy equivalent of less than 5 litres of gasoline over a distance of 100 kilometres.

Other objects, advantages and novel features of the present invention will become apparent from the following detailed description of the invention when considered in conjunction with the accompanying drawings.

BRIEF DESCRIPTION OF THE DRAWINGS

The FIGURE shows a schematic illustration of one possible configuration of a hybrid drive system for carrying out the method according to the invention.

DETAILED DESCRIPTION OF THE DRAWINGS

The FIGURE shows a hybrid drive system 1 which has an internal combustion engine 2 and an electric motor 3 for driving a motor vehicle, which is not illustrated in its totality. Further drive components are indicated, by way of example, by an automatic transmission 4 and an axle gearbox 5. Furthermore, an electrical machine 6 may be coupled to the internal combustion engine 2 directly or via a clutch 100, which is indicated by dashed lines, and is intended as a starter for the internal combustion engine. This electrical machine 6 would be used as a generator during braking operation, with the energy being fed to an energy storage device 7, such as a traction battery.

The configuration of the drive train comprising the components 2, 3, 4, 5 and 6 is intended only as an outline exemplary embodiment, and other hybrid drive systems 1 are also feasible, for example hybrid drive systems with an electrical machine at the gearbox output or the like. Furthermore, of course, appropriate clutch or coupling elements are provided, which are not illustrated explicitly here, but are used to couple the individual drive components and the internal combustion engine 2 or the electric motor 3 to the drive train, or to disconnect them from it.

Furthermore, the hybrid drive system 1 has an electrical auxiliary power unit 8. This electrical auxiliary power unit 8 may be designed to supply electrical power with very high efficiency in a power range which, for example, is around 5–25% of the rated power of the internal combustion engine. For example, the electrical auxiliary power unit could be in the form of a combination of a small internal combustion engine and a generator. As an alternative to this, the electrical auxiliary power unit 8 may be a fuel cell. In a further possible alternative, the electrical auxiliary power unit 8 could also be in the form of a fuel cell system.

An electrical auxiliary power unit 8 in the form of a fuel cell system will be assumed in the following exemplary embodiment. The electrical auxiliary power unit 8, or fuel cell system 8, may have a fuel cell which may, for example, be in the form of a fuel cell stack, as well as a gas production system. In the gas production system, a gas which is rich in hydrogen is produced for the operation of the fuel cell from a fuel which contains carbon and hydrogen. This fuel may, for example, be a gaseous fuel such as natural gas or the like. However, it is particularly advantageous to use a liquid fuel which has a comparatively high energy content in terms of its storage volume. In the case of currently known fuel cell systems 8 with a fuel cell and a gas production system, this could, for example, be a hydrocarbon derivative, in particular methanol. However, other liquid hydrocarbon compounds such as gasoline, diesel or the like, are also feasible.

A gas which is rich in hydrogen is obtained from this source material in a manner known per se in the gas production system. This can preferably be achieved by reformation, for example hot steam reformation, partial oxidation, autothermal reformation or else a pyrolysis reaction, possibly with subsequent selective co-oxidation. These processes are known per se and are not of a major importance for the invention described here, so that they will not be explained in any more detail here.

In the illustrated hybrid drive system 1, both the internal combustion engine 2 and the electrical auxiliary power unit 8, in particular the fuel cell system, are supplied with the same fuel from a single fuel tank 9. This is particularly advantageous since there need be only one fuel tank 9, and since only a single fuel need be carried in the motor vehicle. This fuel may, for example, be methanol or the like, which will be just as suitable for use in the fuel cell system 8 as for use in the internal combustion engine 2. Other fuels are of course also feasible, for example gasoline or diesel. In one refinement, in which the electrical auxiliary power unit 8 is a generator which is operated as an internal combustion engine, the fuel supply could preferably be diesel or gasoline, so that the internal combustion engine 2 and the small internal combustion engine of the electrical auxiliary power unit 8 can be operated using the same fuel since it is available everywhere. When using a fuel cell without a gas production system for the electrical auxiliary power unit 8 it could, for example, also be worthwhile to operate with hydrogen. In one particularly advantageous refinement of this idea, the internal combustion engine 2 can also be operated with hydrogen, so that only a single fuel need be carried in this case as well.

The fuel cell system 8 is connected to the traction battery 7, as has already been mentioned above, as the energy storage device. Furthermore, electrical cables lead from this connection between the fuel cell system 8 and the traction battery 7 via an inverter 10 to the electric motor 3, and via a further inverter 11 to the electrical machine 6. In addition to this configuration, which is required for the traction drive, there may be other electrical loads, for example an air-conditioning compressor 12, that is indicated in outline form, as well as a vehicle power supply system for the motor vehicle, which is in this case indicated by two DC/DC converters 13, for example for two different voltage levels, such as 12 and 42 volts.

For cold starting, the hybrid drive system 1 may first of all be operated via the internal combustion engine 2. The auxiliary drive unit 8 is heated via the exhaust heat from the internal combustion engine 2. The internal combustion engine 2 is not disconnected until the auxiliary power unit 8, in the case of the fuel cell system in particular its gas production system, is at the operating temperature, and operation starts via the auxiliary power unit 8. In order to maintain the readiness of the internal combustion engine 2 for a possibly required restart, thermal management can be provided in the hybrid drive system 1, possibly in the form of the patent application with the application DE 100 46 690.7. If the charge state of the electrical energy store 7 is sufficient, the fuel cell 8 can also be heated electrically, which can then be used to commence the starting process.

The operating strategy for this hybrid drive system 1 now provides for the fuel cell system 8 to be designed such that the maximum possible power output from the fuel cell system 8 is approximately in the region of the mean power demand of the traction drive in a city cycle. The vehicle can be driven by the electric motor 3, with the components which are normally used for controlling and regulating the traction drive being provided for interaction with the operator of the motor vehicle.

If the power demand of the traction drive rises above this mean traction power in the city cycle, then power is also supplied from the traction battery 7 to the electric motor 3, so that it can still satisfy the power demand. An example of a design for a medium class or upper class car could, by way of example, appear in such a way that the fuel cell system allows a power output of 5–10 kW, with the traction battery 7 which, for example, may be in the form of a nickel metal hybrid battery, then having the capability to output a possible peak power of 50 kW. This would result in a system which can cover the power demands of the traction drive that normally occur in city traffic. If the required power for the traction drive now falls below the mean traction power, then the traction battery 7 can be recharged again immediately by the power being produced by the fuel cell systems 8. The internal combustion engine 2 which, analogously to the embodiment mentioned above, can supply a peak power of 30 to 200 kW depending on the embodiment, is switched on only when the power demand rises above the maximum power output which can be supplied in total by the fuel cell system 8 and the traction battery 7. This occurs predominantly with a heavy load or in climbing hills.

Furthermore, the internal combustion engine 2 will in all probability also be connected when covering relatively long driving distances at high speed, since the power which can be supplied in the short term by the fuel cell system 8 and by the traction battery 7 is not sufficient to reach the maximum speed.

All in all, the operation of the internal combustion engine 2 is reduced to a minimum, in the process ensuring the convenience features which are required by the operator of the motor vehicle and which result from characteristics such as maximum speed, climbing power, possible load etc, which are ensured by the presence of the internal combustion engine 2 in the motor vehicle.

What is claimed:

1. A method for operating a hybrid drive system for a traction drive in a motor vehicle, the method comprising:
   operating the traction drive using an electrical motor with power supplied from an auxiliary power unit;
   supplying power from an energy storage device to the electric motor when the traction drive demands power which are greater than the maximum possible power output of the auxiliary power unit; and
   supplying power from an internal combustion engine only when the traction drive's power demand is greater than the total maximum possible power output from the auxiliary power unit and from the energy storage device.

2. The method according to claim 1, when the traction drive makes a power demand which is less than the maximum possible power output from the auxiliary power unit, supplying the electric motor with power from the auxiliary power unit and storing the excess power produced by the auxiliary power unit in the energy storage device.

3. The method according to claim 2, further comprising operating the internal combustion engine and the auxiliary power unit using the same fuel.

4. The method according to claim 1, further comprising operating the internal combustion engine and the auxiliary power unit using the same fuel.

5. The method according to claim 1, further comprising operating the traction drive with the internal combustion engine after cold-starting of the hybrid drive system and using exhaust heat from the internal combustion engine to heat an electrical auxiliary power unit to operating temperature.

6. The method according to claim 1, wherein the maximum power output of the auxiliary power unit is designed to be about the mean power required by a typical city driving cycle.

7. A hybrid drive system for a motor vehicle, the system comprising:
   an electrical motor for driving the motor vehicle;
   an internal combustion engine for driving the motor vehicle;
   an auxiliary power unit for generating electricity, wherein the maximum power output of the auxiliary power unit is designed to be about the mean power required by a typical city driving cycle;
   an energy storage device for storing electricity, wherein when the power demanded by the motor vehicle is less than the maximum power of the auxiliary power unit, only the auxiliary power unit is operated to supply electricity to the electric motor to drive the motor vehicle, wherein when the power demanded by the motor vehicle is greater than the maximum power of the auxiliary power unit but is less than the sum of the maximum power of the auxiliary power unit and the maximum power of the energy storage device, both the auxiliary power unit and the energy storage device supply electricity to the electric motor to drive the motor vehicle, and wherein when the power demanded by the motor vehicle is greater than the sum of the maximum power of the auxiliary power unit and the maximum power of the energy storage device, the internal combustion engine also drives the vehicle.

8. The system according to claim 7, when the power demanded by the motor vehicle is less than the maximum power output of the auxiliary power unit, the excess power produced by the auxiliary power unit is stored in the energy storage device.

9. The system according to claim 8, wherein the internal combustion engine and the auxiliary power unit use the same fuel.

10. The system according to claim 7, wherein the internal combustion engine and the auxiliary power unit use the same fuel.

11. The system according to claim 7, wherein during cold-start, only the internal combustion engine is used to supply power to the motor vehicle, and the exhaust heat from the internal combustion engine is used to heat an auxiliary power unit until the auxiliary power unit reaches operating temperature.

* * * * *